United States Patent
Wang et al.

(10) Patent No.: US 10,719,863 B2
(45) Date of Patent: Jul. 21, 2020

(54) METHOD AND APPARATUS FOR IMPROVING VEHICLE LOSS ASSESSMENT IMAGE IDENTIFICATION RESULT, AND SERVER

(71) Applicant: ALIBABA GROUP HOLDING LIMITED, Grand Cayman (KY)

(72) Inventors: Zixiao Wang, Hangzhou (CN); Guanru Li, Hangzhou (CN); Jian Wang, Hangzhou (CN); Kan Zhang, Hangzhou (CN); Fan Zhou, Hangzhou (CN); Taiwei Zhang, Hangzhou (CN); Taifei Fan, Hangzhou (CN); Danni Cheng, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/715,052

(22) Filed: Dec. 16, 2019

(65) Prior Publication Data
US 2020/0118189 A1 Apr. 16, 2020

Related U.S. Application Data

(63) Continuation of application No. PCT/CN2018/107523, filed on Sep. 26, 2018.

(30) Foreign Application Priority Data

Sep. 29, 2017 (CN) .......................... 2017 1 0911129

(51) Int. Cl.
*G06K 9/00* (2006.01)
*G06Q 30/06* (2012.01)
(Continued)

(52) U.S. Cl.
CPC ..... *G06Q 30/0623* (2013.01); *G06K 9/00624* (2013.01); *G06K 9/46* (2013.01);
(Continued)

(58) Field of Classification Search
None
See application file for complete search history.

(56) References Cited

U.S. PATENT DOCUMENTS 6,459,973 B1 10/2002 Breed et al.
7,103,460 B1 9/2006 Breed
(Continued)

FOREIGN PATENT DOCUMENTS

CN 101242379 A 8/2008
CN 102132300 A 7/2011
(Continued)

OTHER PUBLICATIONS

First Search and First Office Action for Taiwanese Application No. 107118450, dated Mar. 7, 2019, 7 pages.
(Continued)

*Primary Examiner* — Atiba O Fitzpatrick

(57) ABSTRACT

Embodiments of this specification disclose systems and methods for automotive part recognition based on a vehicle damage assessment image. A method includes: obtaining a damage assessment image of a target vehicle; obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain
(Continued)

an automotive part identification serial number of the determined damaged automotive part.

20 Claims, 4 Drawing Sheets

(51) Int. Cl.
*G06K 9/46* (2006.01)
*G06K 9/62* (2006.01)
*G06Q 40/08* (2012.01)

(52) U.S. Cl.
CPC ....... *G06K 9/6267* (2013.01); *G06K 2209/01* (2013.01); *G06Q 40/08* (2013.01)

(56) References Cited

U.S. PATENT DOCUMENTS

| | | | |
|---|---|---|---|
| 7,809,587 | B2 | 10/2010 | Dorai et al. |
| 8,203,425 | B1* | 6/2012 | Medina, III ........... G06Q 40/08 340/5.65 |
| 8,510,196 | B1 | 8/2013 | Brandmaier et al. |
| 9,218,698 | B2 | 12/2015 | Ricci |
| 9,424,606 | B2 | 8/2016 | Wilson, II et al. |
| 10,332,209 | B1 | 6/2019 | Brandmaier et al. |
| 10,417,713 | B1 | 9/2019 | Brandmaier et al. |
| 2005/0108065 | A1 | 5/2005 | Dorfstatter |
| 2009/0002364 | A1 | 1/2009 | Witte, II |
| 2011/0161182 | A1 | 6/2011 | Racco |
| 2012/0076437 | A1 | 3/2012 | King |
| 2014/0316825 | A1 | 10/2014 | Van Dijk et al. |
| 2016/0283787 | A1 | 9/2016 | Nepomniachtchi et al. |
| 2017/0147991 | A1 | 5/2017 | Franke et al. |
| 2017/0352104 | A1 | 12/2017 | Hanson et al. |
| 2019/0051172 | A1* | 2/2019 | Stenneth ............. G08G 1/0129 |
| 2019/0073641 | A1* | 3/2019 | Utke .................... G06K 9/6202 |
| 2020/0050867 | A1 | 2/2020 | Zhang et al. |

FOREIGN PATENT DOCUMENTS

| | | |
|---|---|---|
| CN | 106231263 A | 12/2016 |
| CN | 106296118 A | 1/2017 |
| CN | 103823454 B | 2/2017 |
| CN | 106600421 A | 4/2017 |
| CN | 106600581 A | 4/2017 |
| CN | 106605581 A | 4/2017 |
| CN | 106776681 A | 5/2017 |
| CN | 107194323 A | 9/2017 |
| CN | 107766805 A | 3/2018 |
| DE | 102006048578 B4 | 6/2010 |
| EP | 0982673 A2 | 3/2003 |
| EP | 3605386 A1 | 2/2020 |
| TW | M481428 U | 7/2014 |
| TW | M522886 U | 6/2016 |

OTHER PUBLICATIONS

Second Office Action for Taiwanese Application No. 107118450, dated Aug. 29, 2019, 3 pages.
International Search Report and Written Opinion of the International Search Authority for International Application No. PCT/CN2018/107523, dated Jan. 3, 2019, with partial Machine English translation, 9 pages.
First Search Report for Chinese Application No. 201710911129.1, dated Mar. 3, 2020, 1 page.
Search Report for European Application No. 18860184.3, dated Mar. 16, 2020, 4 pages.
Examination Report for European Application No. 18860184.3, dated Apr. 16, 2020, 6 pages.
Search Report for Taiwanese Application No. 117118450, dated Mar. 27, 2020, 1 page.
International Preliminary Report on Patentability for International Application No. PCT/CN2018/107523, dated Apr. 9, 2020, 11 pages.

* cited by examiner

METHOD AND APPARATUS FOR IMPROVING VEHICLE LOSS ASSESSMENT IMAGE IDENTIFICATION RESULT, AND SERVER

CROSS-REFERENCE TO RELATED APPLICATIONS

The present application is a continuation application of International Patent Application No. PCT/CN2018/107523, filed on Sep. 26, 2018, and entitled "METHOD AND APPARATUS FOR IMPROVING VEHICLE LOSS ASSESSMENT IMAGE IDENTIFICATION RESULT, AND SERVER." The PCT application is based on and claims priority to the Chinese Patent Application No. 201710911129.1, filed on Sep. 29, 2017. The above-referenced applications are incorporated herein by reference in their entirety.

TECHNICAL FIELD

Embodiments of this specification relate to the field of vehicle damage assessment image data processing technologies, and in particular, to systems and methods for improving a recognition result based on a vehicle damage assessment image.

BACKGROUND

As the number of vehicles in use increases every year, the amount of insurance services of insurance companies has also been increasing. Thus, at present, a key industry research direction of various vehicle models is how to quickly and accurately provide users with vehicle damage assessment services.

During vehicle damage assessment, a damaged automotive part of a vehicle usually needs to be determined by recognizing a damage assessment image. The accuracy of recognizing a damaged automotive part mainly depends on an algorithm/model for damage assessment image recognition. A damage location and an extent of damage are obtained by recognizing vehicle damage images (including image and video materials such as pictures and videos) by using various models/algorithms. Then a damage assessment result is obtained according to a corresponding maintenance and repair policy. At present, a model/algorithm used in the industry mainly collects appearance data of various vehicle models in advance, and then uses a constructed automotive part damage algorithm to recognize a damaged automotive part and an extent of damage in the damage assessment image. To ensure recognition precision, as many as possible appearance image data of various vehicles are usually obtained as sample images for training. The period of a model algorithm training and parameter optimization process is usually relatively long, and overall implementation costs are relatively high. In addition, by recognizing a damaged automotive part in an image by purely relying on a model algorithm, the accuracy of recognizing a part is also limited to the amount of collected vehicle appearance image data. Therefore, during vehicle damage assessment image recognition, a processing solution with lower implementation costs and more accurate recognition result is needed.

SUMMARY

In some embodiments, the disclosed systems and methods may improve vehicle damage assessment precision and the damage assessment speed.

A computer-implemented method for automotive part recognition based on a vehicle damage assessment image, includes: obtaining a damage assessment image of a target vehicle; obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain an automotive part identification serial number of the determined damaged automotive part.

In some embodiments, the obtaining an automotive part list of the target vehicle based on a vehicle identification code of the target vehicle comprises: in a process of obtaining the damage assessment image of the target vehicle, querying automotive part data of the target vehicle according to the vehicle identification code, and converting the automotive part data into a plurality of corresponding automotive part identification serial numbers.

In some embodiments, the determining a damaged automotive part of the target vehicle from the damage assessment image based on the customized configuration information of the automotive parts of the target vehicle and an image recognition algorithm comprises: reading the customized configuration information of the automotive parts of the target vehicle in the automotive part list; recognizing the damaged automotive part in the damage assessment image by using the image recognition algorithm; and determining the automotive part identification serial number of the recognized damaged automotive part according to the customized configuration information of the automotive parts of the target vehicle in the automotive part list.

In some embodiments, the customized configuration information of the automotive parts comprises at least one information selected from the following: information indicating a feature attribute of automotive parts in a same vehicle model and a same level configuration; information indicating at least two level classifications of automotive parts; and data indicating a customized feature of an automotive part on the target vehicle.

In some embodiments, the determining a damaged automotive part of the target vehicle from the damage assessment image based on the customized configuration information of the automotive parts of the target vehicle and an image recognition algorithm comprises: determining an automotive part classification to which the damaged automotive part recognized by using the image recognition algorithm belongs based on the customized configuration information of the automotive parts; and using the image recognition algorithm to recognize the damaged automotive part based on the automotive part classification.

In some embodiments, the determining a damaged automotive part of the target vehicle from the damage assessment image based on the customized configuration information of the automotive parts of the target vehicle and an image recognition algorithm comprises: in response to the customized configuration information of the automotive parts indicating that there is no automotive part matching the damaged automotive part recognized by using the image recognition algorithm, searching the customized configuration information of the automotive parts for an automotive part having an automotive part inclusion relationship with the recognized damaged automotive part, and determining the automotive part having the inclusion relationship as the recognized damaged automotive part.

In some embodiments, the automotive part having the automotive part inclusion relationship with the recognized damaged automotive part includes the recognized damaged automotive part or is included in the recognized damaged automotive part.

An apparatus for automotive part recognition based on a vehicle damage assessment image includes: one or more processors and one or more non-transitory computer-readable memories coupled to the one or more processors and configured with instructions executable by the one or more processors to cause the apparatus to perform operations comprising: obtaining a damage assessment image of a target vehicle; obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain an automotive part identification serial number of the determined damaged automotive part.

A non-transitory computer-readable storage medium is configured with instructions executable by one or more processors to cause the one or more processors to perform operations comprising: obtaining a damage assessment image of a target vehicle; obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain an automotive part identification serial number of the determined damaged automotive part.

A server includes at least one processor and a memory for storing instructions executable by the processor, where the processor executes the instructions to implement: obtaining a damage assessment image of a target vehicle; obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain an automotive part identification serial number of the determined damaged automotive part.

The embodiments of this specification provide a method, an apparatus, and a server for improving a recognition result based on a vehicle damage assessment image. Before a damage assessment image of a target vehicle is processed, customized configuration of the target vehicle may be obtained based on information in an automotive part list of the target vehicle, to determine feature data of automotive parts on the target vehicle. Then, a damaged automotive part is recognized by using an image recognition algorithm. After the damaged automotive part is recognized, an automotive part identification serial number of the damaged automotive part is output based on the automotive part list. The automotive part identification serial number can uniquely and accurately determine the automotive part, thereby greatly improving the accuracy of an output damage assessment image recognition result. In addition, according to the obtained automotive part customized configuration data of the target vehicle, an automotive part type that is inconsistent with the configuration of automotive parts of the target vehicle can be removed before the damaged automotive part is recognized from the damage assessment image, thereby improving the damage assessment image recognition processing speed. According to the embodiments provided in this specification, before the damaged automotive part is recognized, the automotive part list refined to the individual vehicle level can be used to determine the customized configuration of the target vehicle, so that recognition errors caused by vehicle model difference can be effectively reduced, the accuracy of the recognition result based on the damage assessment image can be improved, and the overall recognition costs and the learning period of the damage assessment image recognition algorithm can be reduced, thereby greatly improving efficiency of the overall recognition process based on the vehicle damage assessment image.

BRIEF DESCRIPTION OF THE DRAWINGS

To describe the technical solutions in the embodiments of this specification or in existing technologies more clearly, the following briefly describes the accompanying drawings for describing the embodiments or the existing technologies. Apparently, the accompanying drawings in the following description show merely some embodiments of this specification, and a person of ordinary skill in the art may still derive other drawings from these accompanying drawings without creative efforts.

DETAILED DESCRIPTION

Figure 1:
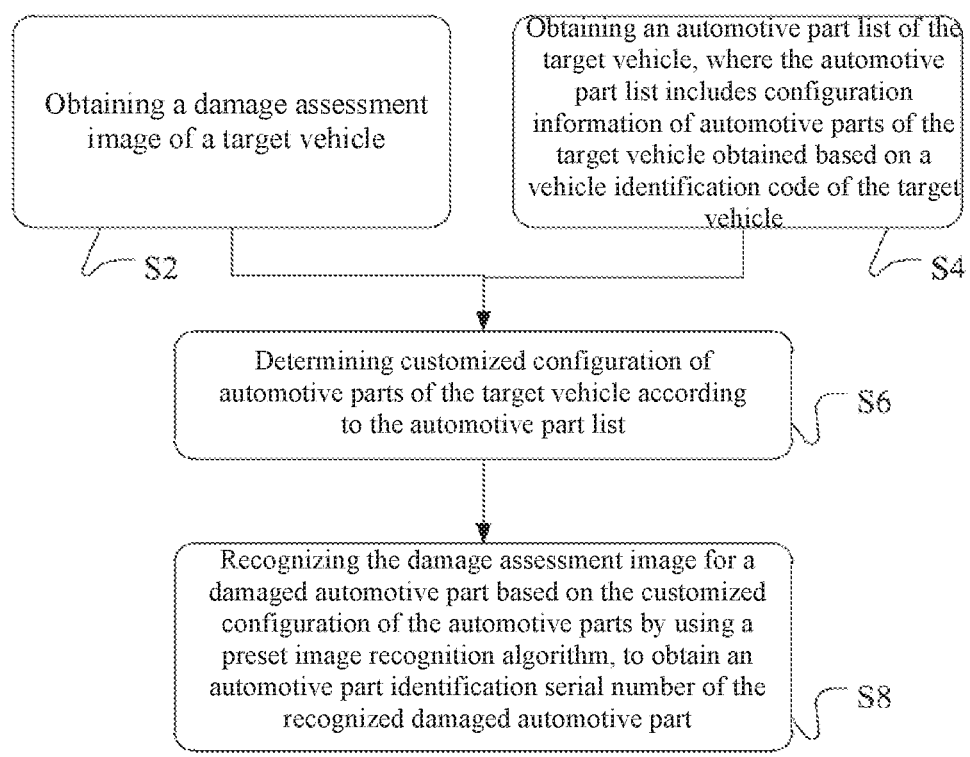
FIG. 1 is a schematic flowchart of a method for improving a recognition result based on a vehicle damage assessment image according to some embodiments of this specification.

To make a person skilled in the art better understand the technical solutions in this specification, the embodiments of this specification are clearly described in the following with reference to the accompanying drawings in the embodiments of this specification. Apparently, the described embodiments are merely some but not all of the embodiments of this specification. All other embodiments obtained by a person of ordinary skill in the art based on one or more embodiments of this specification without creative efforts shall fall within the protection scope of the embodiments of this specification.

Existing vehicles may be classified into various types. Due to different factors such as year, configurations (such as high, medium and low configurations), and even personalized customization by manufacturers, automotive parts in the same location on vehicles with the same vehicle model may still have a relatively large difference, or may be even completely different. For example, in bumpers of the same vehicle model, a front bumper of a comfort configuration is integral, while a front bumper of a luxury configuration is three-stage. Alternatively, there is a trim on a bumper of a medium-configuration vehicle model, and there is no trim on a bumper of a low-configuration vehicle model. Existing processing solutions of recognizing a damaged automotive part of a vehicle by purely relying on image recognition technologies have difficulty in recognizing the foregoing differences, or requires an image recognition algorithm and sample data associated with higher costs and a longer learning period. Current vehicle manufacture has been increasingly standardized, so that automotive parts can be precisely purchased in the market by obtaining automotive part identification serial numbers (also referred to as automotive part OE numbers, which indicate serial numbers of parts and automotive parts of a vehicle model manufactured by a vehicle manufacturer). Although vehicle models are different, manufacturers usually retain configuration information of each factory vehicle. Therefore, in the one or more embodiments of this specification, automotive part list information of a vehicle for damage assessment can be obtained by using a unique vehicle identification code of the vehicle. Then the automotive part list information is combined with an image recognition algorithm, so that the accuracy of a damaged automotive part recognition result using a damage assessment image algorithm can be significantly improved, and additional learning costs and a learning period of an image recognition algorithm/module can be greatly reduced.

According to the method for improving a recognition result based on a vehicle damage assessment image provided in the embodiments of this specification, an automotive part list of a currently being processed vehicle can be obtained before a damaged automotive part is recognized by using an image recognition algorithm, and customized configuration of automotive parts of the vehicle can be determined according to the automotive part list. For example, it can be determined according to the automotive part list, whether there is a trim outside a bumper, whether there is a fog lamp, whether an automotive part has a left part and a right part, and whether an automotive part has a customized logo (LOGO). After the customized configuration of the automotive parts of the target vehicle is determined, recognition of the image is performed by using the image recognition algorithm, a damaged automotive part in the customized configuration of the automotive parts of the target vehicle is determined, and an automotive part identification serial number of the determined damaged automotive part is output. The automotive part identification serial number may be used for precise purchase; or the automotive part identification serial number may be fed back to a vehicle user or an insurance company along with other information, so that vehicle damage assessment-related processing can be performed more precisely based on the automotive part identification serial number.

FIG. 1 is a schematic flowchart of a method for improving a recognition result based on a vehicle damage assessment image according to this specification. Although this specification provides method operational steps or apparatus structures shown in the following embodiments or accompany drawings, more operational steps or module units, or fewer operational steps or module units enabled by integrating some operational steps or module units may be included in the methods or the apparatuses based on conventional efforts or without creative efforts. In the steps or structures in which no necessary causal relationship logically exists, the execution order of the steps or the module structure of the apparatus is not limited to the execution orders or module structures shown in the embodiments or the accompany drawings of the embodiments of this specification. When the methods or module structures are applied to an apparatus, a server, or a terminal product in practice, sequential execution or parallel execution may be performed according to the methods or module structures shown in the embodiments or the accompany drawings (for example, in a parallel processor or multi-thread processing environment, or even in environments including distributed processing and server clustering).

The method provided in the embodiments of this specification can be applied to a server used for vehicle damage assessment image recognition processing, a client (such as a mobile terminal in which a damage assessment service application is installed) for taking photos on the scene for damage assessment image processing, or other electronic devices, to recognize a damage assessment image, and obtain an accurate automotive part identification serial number of a damaged automotive part of a vehicle from an automotive part list of the vehicle. For example, processing on a server side is used as an implementation scenario for description. As shown in FIG. 1, in the embodiments of the method for improving a recognition result based on a vehicle damage assessment image according to this specification, the method may include the following steps S2-S8.

S2: Obtaining a damage assessment image of a target vehicle.

A server may obtain the damage assessment image of the vehicle. For example, an image that is captured by a mobile terminal on the scene can be transmitted to the server. In another example, an image may be obtained from a mobile storage device, a remote storage device, or other third-party service platforms. The image described in the embodiments of this specification may be a general term for various graphics and images, may usually refer to an image having a visual effect, generally including images on paper, negatives or photographs, televisions, projectors, or computer screens. In some embodiments, the damage assessment image may include a single image of a vehicle or a video obtained through recording (a video may be considered as a set of continuous images).

S4: Obtaining an automotive part list of the target vehicle, where the automotive part list includes configuration information of automotive parts of the target vehicle obtained based on a vehicle identification code of the target vehicle.

In some embodiments, information about a damaged automotive part that is obtained by using an image recognition algorithm may indicate that the damaged automotive part is a part of a vehicle model, such as a bumper, a front door, or a taillight. However, for vehicle models with different configurations, some parts are different, or appearances and shapes of some parts are greatly different. Therefore, in the embodiments of this specification, a vehicle identification code of the vehicle may be obtained according to related information (such as identity information of an owner of the vehicle) of the currently being processed vehicle. The vehicle identification code is also referred to as a vehicle identification number (VIN) code, and is a unique identifier of a vehicle. Then, the automotive part list of the currently being processed vehicle is obtained according to the vehicle identification code. In a process of obtaining the damage assessment image by the server, the data volume of the image is far greater than the vehicle identification code. Therefore, in some embodiments provided in this specification, automotive part data of the target vehicle may be queried to obtain the automotive part list while the damage assessment image is being transmitted to an image recognition processing algorithm server. For example, the obtaining an automotive part list of the target vehicle may include the following step S401.

S401: In a process of obtaining the damage assessment image of the target vehicle, querying automotive part data of the target vehicle according to a vehicle identification code, and converting the automotive part data into a plurality of corresponding automotive part identification serial numbers.

In this way, the automotive part list of the target vehicle may be prepared in advance before the algorithm server recognizes the damage assessment image; or the automotive part list of the target vehicle may be already prepared on a host before the image is completely transmitted, thereby improving image recognition processing efficiency.

The automotive part list may usually include information that describes each automotive part of the vehicle in detail and comprehensively. For example, different configuration levels of the same vehicle type may correspond to different automotive part lists, different manufacture years or months of the same vehicle type may correspond to different automotive part lists, or different engine capacities, manual/automatic speed changing boxes, or even vehicles of the same model soled online or at offline stores may correspond to different automotive part lists, etc. A personal or company-customized vehicle, or the like has a separate corresponding automotive part list.

The automotive part list may include automotive part data of each automotive part of the vehicle, such as a part name, a model, a specification, a feature, and the like. Generally, the automotive part list may further include automotive part identification serial numbers corresponding to the automotive part data. The automotive part identification serial numbers may be automotive part OE codes, which refer to serial numbers of parts and automotive parts of a vehicle model manufactured by a main engine factory (automaker), and the serial numbers may be used for precise automotive part purchase on the market.

In some embodiments, the timing for obtaining the automotive part list may include: before the damage assessment image is processed, the vehicle identification code of the currently being processed vehicle may be obtained, and the automotive part list may be queried according to the vehicle identification code. Alternatively, the automotive part list of the target vehicle may be obtained in a process of transmitting the damage assessment image to the server or in a process of recognizing the damage assessment image by the server. In addition, a manner of obtaining information of the automotive part list may include obtaining the automotive part list or the automotive part data from an associated party.

S6: Determining customized configuration of automotive parts of the target vehicle according to the automotive part list.

After the automotive part list of the target vehicle is obtained, the customized configuration of the automotive parts of the target vehicle can be further determined according to detailed automotive part data of the target vehicle in the automotive part list. The automotive part categories may include detailed automotive part data of each automotive part of the target vehicle. In some embodiments, the automotive part data can be used to resolve the problem that customized automotive parts of the same vehicle model may have differences caused by different configurations. The detailed automotive part data of the target vehicle can be obtained from the automotive part list to indicate, for example, whether a bumper includes upper and lower parts, whether there is a trim, and whether there is a fog lamp. For example, in some embodiments provided in this specification, the customized configuration information of the automotive parts may include at least one of the following: information indicating a feature attribute of vehicle automotive parts in the same vehicle model and in the same level of configuration; information indicating at least two level classifications of the automotive part; and customized feature data indicating that the automotive part is on the target vehicle.

In some embodiments, in the vehicle model to which the target vehicle belongs, at different configuration levels, some automotive parts are different. For example, bumpers of a medium configuration of the vehicle model and a high configuration of the vehicle model have trims, and only the bumper of the high configuration of the vehicle model has a bright silver ABS trim. It may be learned from the automotive part that the customized configuration of automotive parts of a target vehicle Cl includes: a bumper with a trim, a fog lamp, a blackened LED taillight, and the like. Other customized configuration of automotive parts may further be included. For example, a bumper includes upper and lower parts, or there is some personal- or enterprise-customized vehicle feature data. For example, a vehicle LOGO on an intake grille is blue (while a regular vehicle have the same vehicle insurance has a white vehicle LOGO on an intake grille), or the taillights and wheels are other customized automotive parts.

In some embodiments, when the customized configuration of the automotive parts of the target vehicle is determined according to the automotive part data, the customized configuration of the automotive parts may include information indicating other feature attributes of the automotive parts. For example, the information may include specification of the automotive parts, or may indicate whether the vehicle includes features distinguishing the vehicle from other vehicles of the same vehicle type, such as other automotive parts. For example, automotive part data of the bumper of the target vehicle Cl in the automotive part list may include "bumper with a bright silver ABS plating trim." In another example, the feature information may further indicate whether a front bumper is of a three-stage type or an integral type, whether a headlight is a halogen lamp or a xenon lamp, and whether a front passenger door has a side curtain airbag, and the like. When the damaged automotive parts differ for vehicles of the same vehicle type, different vehicle configurations, and different batches, some personalized configuration information in the damaged automotive parts may be further determined in the automotive part list according to some embodiments provided in this specification, thereby improving precision of recognizing the damaged automotive part in the damage assessment image.

S8: Recognizing the damage assessment image for a damaged automotive part based on the customized configuration of the automotive parts by using a preset image recognition algorithm, to obtain an automotive part identification serial number of the recognized damaged automotive part.

Based on the customized configuration of the target vehicle, the algorithm server may recognize the damage assessment image. In some embodiments, accurate classifications of the automotive parts of the target vehicle may be determined in advance, so that an automotive part type that cannot be included in the target vehicle is excluded, the damaged automotive part in the damage assessment image can be accurately recognized, and the automotive part identification serial number of the damaged automotive part can be output, thereby greatly improving damage automotive part recognition accuracy.

When the damaged automotive part is obtained according to the image recognition algorithm, a precise OE code (an automotive part identification serial number) of the damaged automotive part may be output by referencing the foregoing automotive part list. The automotive part list may usually include the automotive part identification serial number of the automotive part. The automotive part identification serial number may be used for precise automotive part determination, to facilitate purchasing on the market or market price obtaining; or the automotive part identification serial number may be fed back to a vehicle user or an insurance company with other information, and the insurance company or third-party service platforms may perform vehicle damage assessment processing more precisely based on the automotive part identification serial number. For example, price data of the automotive part is queried by using the automotive part identification serial number, or damage assessment information of the vehicle is further determined based on the queried price data of the automotive part.

In some embodiments of the method provided in this specification, recognizing the damage assessment image for a damaged automotive part based on the customized configuration of the automotive parts by using a preset image recognition algorithm includes the following steps S801-S802.

S801: Before recognizing the damage assessment image, reading data of the customized configuration of the automotive parts of the target vehicle, and determining the configuration information of the automotive parts of the target vehicle.

S802: Recognizing the damaged automotive part in the damage assessment image by using the preset image recognition algorithm, and determining the automotive part identification serial number of the recognized damaged automotive part based on the automotive part list.

The server may determine the damaged automotive part and an extent of damage thereof in the damage assessment image by recognizing the damage assessment image of the vehicle. For example, in addition to the OE code of the damaged automotive part, the server may output a name of the damaged automotive part, and related data of the extent of damage, such as a label (such as a Chinese label or English label) of the damaged automotive part, and a type (such as, slight, severe, or the like) or a score value (such as, 50%, 80%, or the like) of the extent of damage.

In some embodiments, a damaged automotive part recognition model for recognizing the damaged automotive part of the vehicle in the damage assessment image may be constructed in advance by using a designed image recognition algorithm. After early-stage sample training, the damaged automotive part recognition model may recognize a damage location and a damage type of an automotive part in the image of the part. In some embodiments, the image recognition algorithm may include some network model algorithms and variations of deep neural networks, and a processing algorithm of the damaged automotive part recognition model that is constructed by sample training. For example, the algorithm model for image recognition may be constructed based on a convolutional neural network (CNN) and a region proposal network (RPN) and in combination with a pooling layer, a fully-connected layer, and the like. After obtaining the damage assessment image, the server may recognize the damage assessment image by using the algorithm model, to determine the damaged automotive part of the vehicle from the damage assessment image. The commonly used image recognition algorithm can sort a recognition result into a classification. For example, a softmax layer outputs an automotive part classification label of the damaged automotive part. In some embodiments, the type of the damaged automotive part may be determined based on the vehicle automotive parts, so that an automotive part classification in the customized configuration of the automotive parts in the algorithm model may be used as an automotive part classification output in the image recognition algorithm. In some embodiments, recognizing the damage assessment image for a damaged automotive part based on the customized configuration of the automotive parts by using a preset image recognition algorithm includes: using information including the customized configuration of the automotive parts as an automotive part classification to which the damaged automotive part recognized by using the image recognition algorithm belongs.

The same type of models or algorithms may be selected as the foregoing image recognition algorithm. For example, multiple models and their variations based on the CNN and the RPN, such as Faster R-CNN, YOLO, and Mask-FCN, may be used. The CNN may include any CNN model, such as ResNet, Inception, VGG, or variations thereof. For example, in a convolutional neural network, the classification of each automotive part in the customized configuration of the automotive parts can be used as an automotive part classification label of the softmax layer, and when the automotive part is recognized as a bumper, whether the bumper is an upper bumper or a lower bumper can be directly output.

Figure 2:
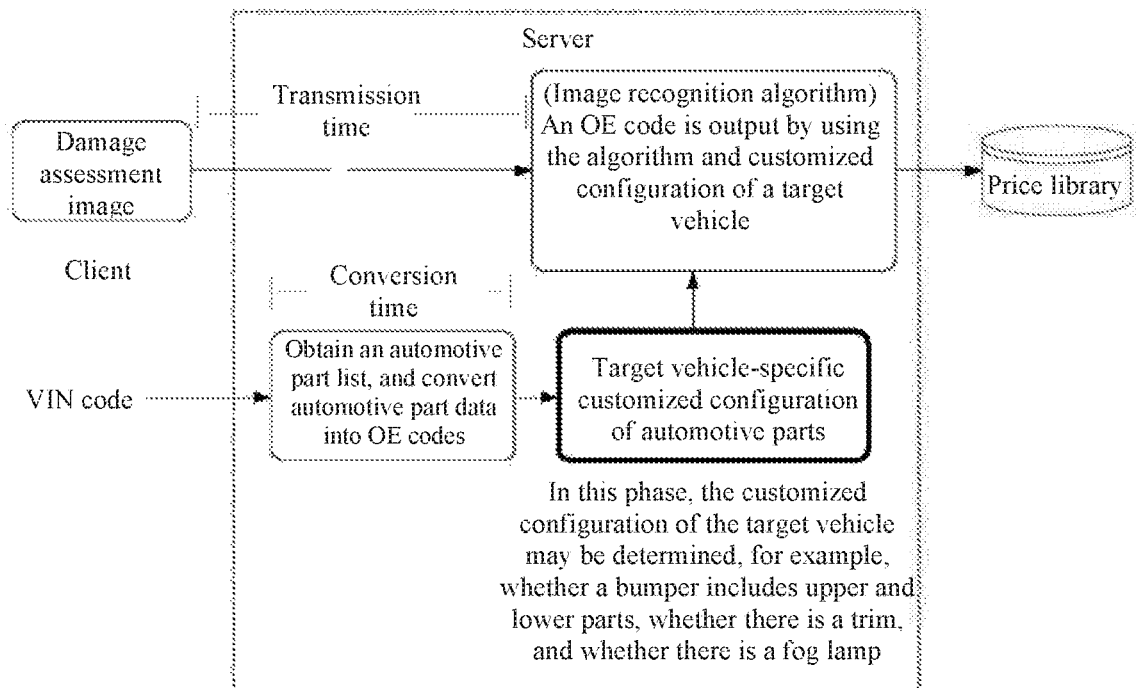
FIG. 2 is a schematic diagram of a processing procedure of an implementation scenario of performing damage assessment image processing according to some embodiments of this specification.

FIG. 2 is a schematic diagram of a processing procedure of an implementation scenario of performing vehicle damage assessment image processing according to some embodiments of this specification. A client may send a damage assessment image to a server, and while the image is being transmitted to the server, automotive part data of a target vehicle may be queried. The data volume of the automotive part data is much less than the data volume of the damage assessment image. Therefore, the data volume of the automotive part data may be obtained by querying the automotive part data of the target vehicle before the damage assessment image is completely transmitted. In some implementation scenarios, if there is no corresponding automotive part identification serial number in the automotive part data, after an automotive part list is obtained, the automotive part data in the automotive part list is converted into corresponding OE codes. In a conversion manner, conversion may be performed by querying a mapping relationship between an automotive part and an OE code. The server determines customized configuration of automotive parts of the target vehicle based on the automotive part data of the target vehicle, for example, whether a bumper includes upper and lower parts, whether there is a trim, and whether there is a fog lamp. Then, a damaged automotive part is recognized from the damage assessment image based on the customized configuration of automotive parts.

For example, before the customized configuration of automotive parts is referenced, a recognition result of the damage assessment image by using an image recognition algorithm may be a "bumper". However, after the methods of the embodiments are used, the bumper of the target vehicle determined according to the automotive part data may be a bumper with a trim. Therefore, for the same damage assessment image, a result output by using the image recognition algorithm may be "bumper with a bright silver ABS trim" corresponding to the customized configuration of automotive parts of the target vehicle. In some embodiments, the automotive part may be converted into a corresponding OE code to output. The output OE code may continue to be processed by the server. For example, a data library is queried by using the output OE code, or the output OE code may be sent to an insurance company or other third-party service parties for damage assessment processing.

A person skilled in the art can understand that the solutions provided in the embodiments of this specification can be applied to various vehicle damage assessment implementation scenarios, for example, vehicle damage assessment of an insurance company or a repair shop, or a vehicle damage assessment service provided by a 4S store or a cloud server, or damage assessment recognition processing provided by a server or a client. A terminal device for processing may include a separate processing server, or may include a server of a partner entity for mutual communication to complete the implementations; or a damaged automotive part recognized by the server or an automotive part identification serial number of the recognized damaged automotive part may be sent to other servers for damage assessment-related processing.

In another implementation scenario, in addition to information for further determining other features of the damaged automotive part which is preliminarily recognized, vehicle configurations in the automotive part list further includes multi-level classifications of different configuration locations for some parts. For example, the preliminarily recognized damaged automotive part is a front bumper. However, the bumper of a corresponding vehicle model includes right and left parts, namely, a left front bumper and a right front bumper. Therefore, in another embodiment of the method of this specification, when the difference between automotive parts in different classifications cannot be recognized in the processing by the image recognition algorithm, the damage assessment image corresponding to the automotive part may be recognized again, to determine a corresponding automotive part in the automotive part list. In some embodiments, the damage assessment image may be input to the image recognition algorithm again. For example, the damage assessment image may be recognized by using the same image recognition algorithm again. Some parameters may be adjusted when the recognition is performed again. In other embodiments, the recognition may be performed by alternatively using a different image recognition algorithm, such as a recognition processing algorithm for left and right locations, material, color, and the like of the part. For example, a corresponding algorithm may be set according to different classifications such as locations, materials, and colors of the customized configuration of the target vehicle. In this way, if the automotive part in the damage assessment image further has different types according to the automotive part category/classification, recognition of the image may be performed multiple times or in multiple manners based on the automotive part customized configuration. The recognition may focus on this type of damage assessment images, so that a more accurate result for recognizing a damaged automotive part in the damage assessment images can be obtained.

Figure 3:
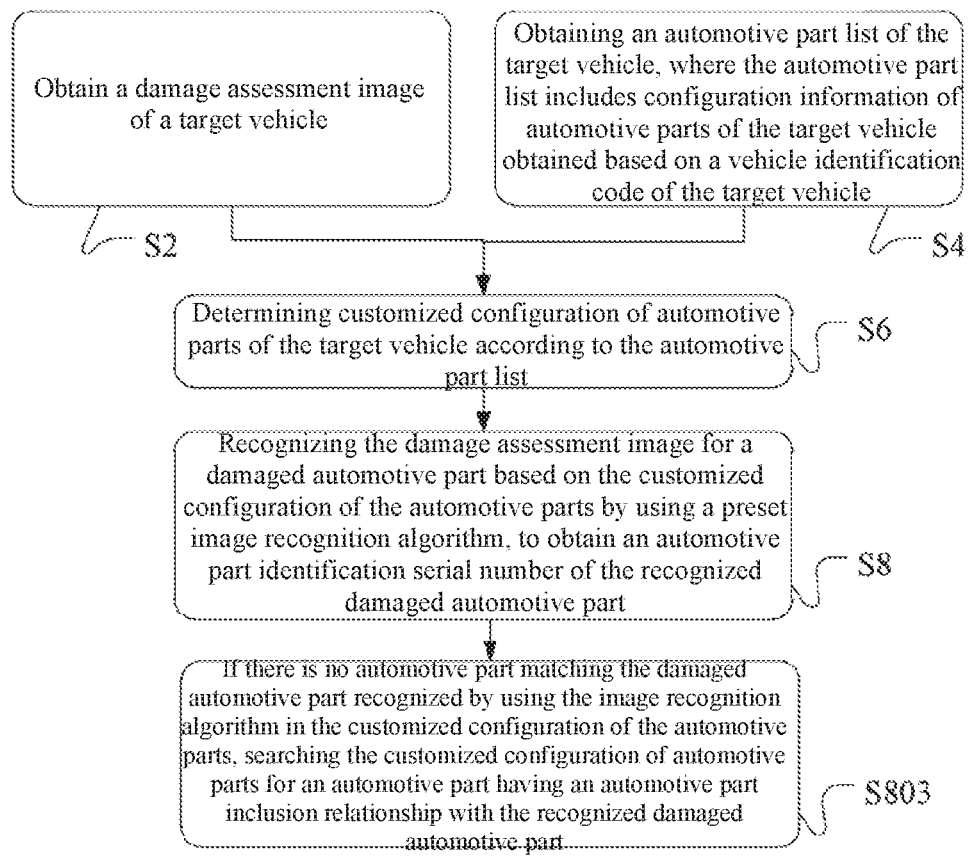
FIG. 3 is a schematic flowchart of another method for improving a recognition result based on a vehicle damage assessment image according to some embodiments of this specification.

FIG. 3 is a schematic flowchart of another method for improving a recognition result based on a vehicle damage assessment image according to some embodiments of this specification. In some embodiments, if there is no matching automotive part in the customized configuration of automotive parts in a first time of recognition, for example, the automotive part cannot be found after the damage assessment image is re-recognized, or a corresponding automotive part cannot be found in the customized configuration of automotive parts based on the name of the damaged automotive part recognized in using the damage assessment image. Therefore, an automotive part having an inclusion relationship with the recognized damaged automotive part may be queried in a higher level or a lower level in the customized configuration of automotive parts. In other embodiments of the method in this specification, the recognizing the damage assessment image for a damaged automotive part based on the customized configuration of the automotive parts by using a preset image recognition algorithm may include:

S803: If there is no automotive part matching the damaged automotive part recognized by using the image recognition algorithm in the customized configuration of the automotive parts, searching the customized configuration of automotive parts for an automotive part having an automotive part inclusion relationship with the recognized damaged automotive part, and using the found automotive part having the inclusion relationship as the recognized damaged automotive part.

For example, the damaged automotive part recognized by using the image recognition algorithm is a rear fender, and when the rear fender is not found in the customized configuration of the target vehicle, a rear fender assembly can be searched for, where the rear fender assembly includes the rear fender. In some implementation scenarios, automotive parts of a vehicle do not have a separate rear fender. If the rear fender is to be replaced, the automotive part of an entire rear fender assembly may need to be replaced. Similarly, when a rearview mirror, which is determined as the damaged automotive part, is not found, vehicle automotive parts included in the damaged automotive part of the rearview mirror can be searched, and a rearview mirror housing may be found. Therefore, through the embodiments, when the recognized damaged automotive part is not found in the customized configuration of the automotive parts, an automotive part having an inclusion relationship may be searched for upward or downward.

According to the one or more embodiments of this specification, before the image is recognized, a configuration list may be read first, and whether an automotive part has a special configuration (for example, whether there is a fog lamp), a location relationship of the automotive part (for example, whether a bumper includes upper and lower parts), and an inclusion relationship between automotive parts (whether there is a rear fender, or whether there is only a rear fender assembly) may be determined, so that a result of an automotive part that cannot be included in the target vehicle is removed. Then, a precise OE code is output according to the recognition result and the configuration list.

According to the methods for improving a recognition result based on a vehicle damage assessment image, before a damage assessment image of a target vehicle is recognized, a customized configuration of automotive parts of the target vehicle may be obtained by using automotive part list information of the target vehicle, to determine feature data of an automotive part on the target vehicle. Then, a damaged automotive part is recognized by using an image recognition algorithm. After the damaged automotive part is recognized, an automotive part identification serial number of the damaged automotive part is output based on the automotive part list, and the automotive part identification serial number can uniquely and accurately determine the automotive part, thereby greatly improving accuracy of an output damage assessment image recognition result. In addition, according to the obtained automotive part customized configuration data of the target vehicle, an automotive part type that does not conform to an automotive part configuration of the target vehicle can be removed before the damaged automotive part is recognized from the damage assessment image, thereby improving the damage assessment image recognition processing speed. According to the embodiments in this specification, the customized configuration of the target vehicle can be determined with reference to the automotive part list refined into an individual vehicle, and then the damaged automotive part is recognized, so that recognition errors caused by vehicle model difference can be effectively reduced, accuracy of the damage assessment image recognition result can be improved, and overall recognition costs and the learning period of the damage assessment image recognition algorithm can further be reduced, thereby greatly improving efficiency of the overall vehicle damage assessment image recognition.

Based on the foregoing methods for improving a recognition result based on a vehicle damage assessment image, this specification further provides an apparatus for improving a recognition result based on a vehicle damage assessment image. The apparatus may include system (including a distributed system), software (application), module, component, server, client, quantum computer, and the like using the methods in the embodiments of this specification, in combination with necessary implementations of hardware. Based on the same concept, an apparatus provided in this specification is described in the following embodiments. Implementations of the methods and the apparatus for resolving the problems are similar. Therefore, for implementations of the apparatus in the embodiments of this specification, refer to the implementations of the foregoing methods, and repetitions are not described. The following terms "unit" or "module" may refer to a combination of software and/or hardware having predetermined functions. Although the apparatus described in the following embodiments are implemented by using software, embodiments of the apparatus implemented by using hardware, or those by using a combination of software and hardware are also possible and conceivable.

Figure 4:
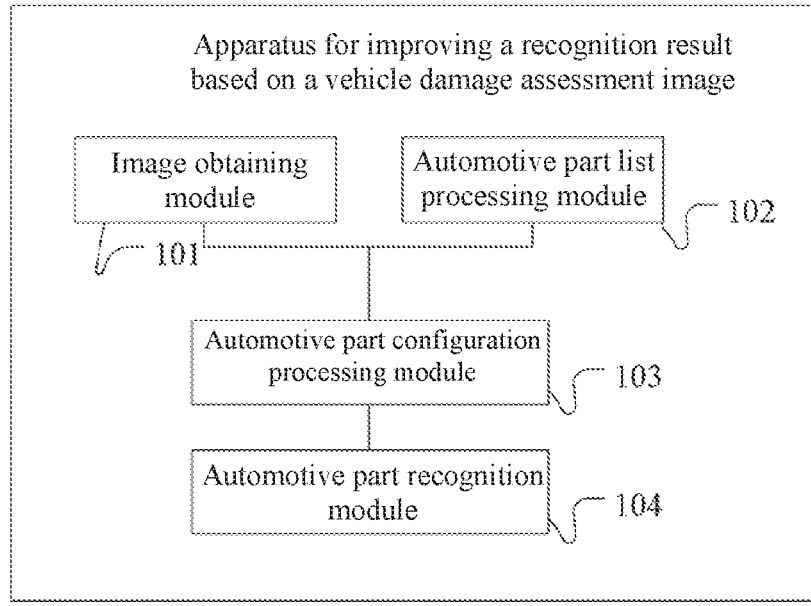
FIG. 4 is a schematic module structural diagram of an apparatus for improving a recognition result based on a vehicle damage assessment image according to some embodiments of this specification.

FIG. 4 is a schematic module structural diagram of an apparatus for improving a recognition result based on a vehicle damage assessment image according to some embodiments of this specification. As shown in FIG. 4, the apparatus may include: an image obtaining module 101, configured to obtain a damage assessment image of a target vehicle; an automotive part list processing module 102, configured to obtain an automotive part list of the target vehicle, where the automotive part list includes configuration information of automotive parts of the target vehicle obtained based on a vehicle identification code of the target vehicle; an automotive part configuration processing module 103, configured to determine customized configuration of the automotive parts of the target vehicle according to the automotive part list; and an automotive part recognition module 104, configured to recognize the damage assessment image for a damaged automotive part based on the customized configuration of the automotive parts by using a preset image recognition algorithm, to obtain an automotive part identification serial number of the recognized damaged automotive part.

The damaged automotive part of the vehicle is determined, and the automotive part identification serial number of the damaged automotive part is obtained, so that the automotive part can be precisely determined, to facilitate purchasing on the market or obtaining of a market price; or the automotive part identification serial number may be fed back to other associated parties such as a vehicle user or an insurance company with other information, so that the insurance company or third-party service platforms can perform vehicle damage assessment processing more precisely based on the automotive part identification serial number. In some embodiments of the apparatus, the automotive part list processing module 102 may include: a synchronous conversion module 1021, configured to: in a process of obtaining the damage assessment image of the target vehicle, querying automotive part data of the target vehicle according to the vehicle identification code, and converting the automotive part data into a plurality of corresponding automotive part identification serial numbers.

In some embodiments of the apparatus, that the automotive part configuration processing module 103 determines the customized configuration of the automotive parts of the target vehicle according to the automotive part list may include: before recognizing the damage assessment image, reading data of the customized configuration of the automotive parts of the target vehicle, and determining the configuration information of the automotive parts of the target vehicle; and recognizing the damaged automotive part in the damage assessment image by using the preset image recognition algorithm, and determining the automotive part identification serial number of the recognized damaged automotive part according to the automotive part list.

Figure 5:
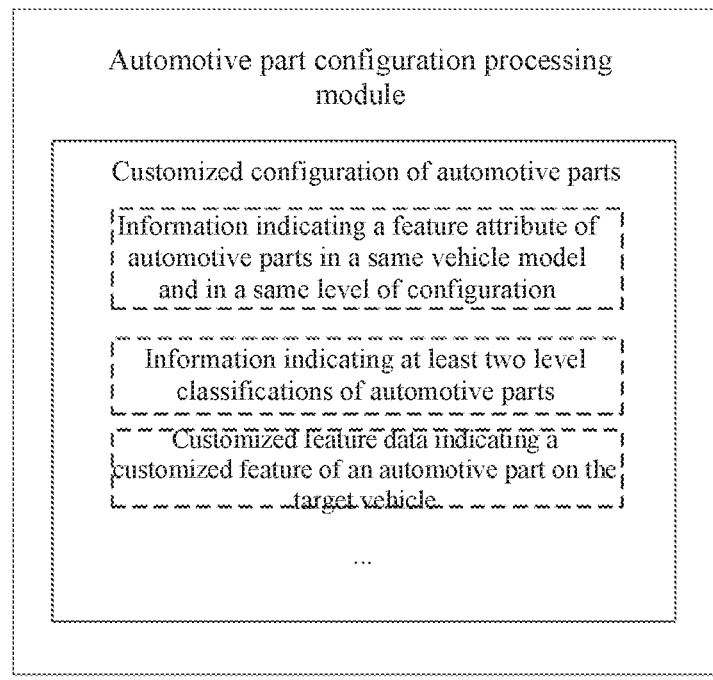
FIG. 5 is a schematic module structural diagram of another apparatus for improving a recognition result based on a vehicle damage assessment image according to some embodiments of this specification.

FIG. 5 is a schematic module structural diagram of another apparatus for improving a recognition result based on a vehicle damage assessment image according to some embodiments of this specification. As shown in FIG. 5, in the embodiments of the apparatus, the customized configuration of automotive parts determined by the automotive part configuration processing module 103 may include at least one type of information selected from the following information: information indicating a feature attribute of vehicle automotive parts in a same vehicle model and in a same level of configuration; information indicating at least two level classifications of vehicle automotive parts; and data indicating a customized feature of an automotive part on the target vehicle.

In some embodiments of the apparatus, that the automotive part recognition module 104 recognizes the damage assessment image for the damaged automotive part based on the customized configuration of the automotive parts by using the preset image recognition algorithm may include: using information including the customized configuration of the automotive parts as an automotive part classification to which the damaged automotive part recognized by using the image recognition algorithm belongs.

Figure 6:
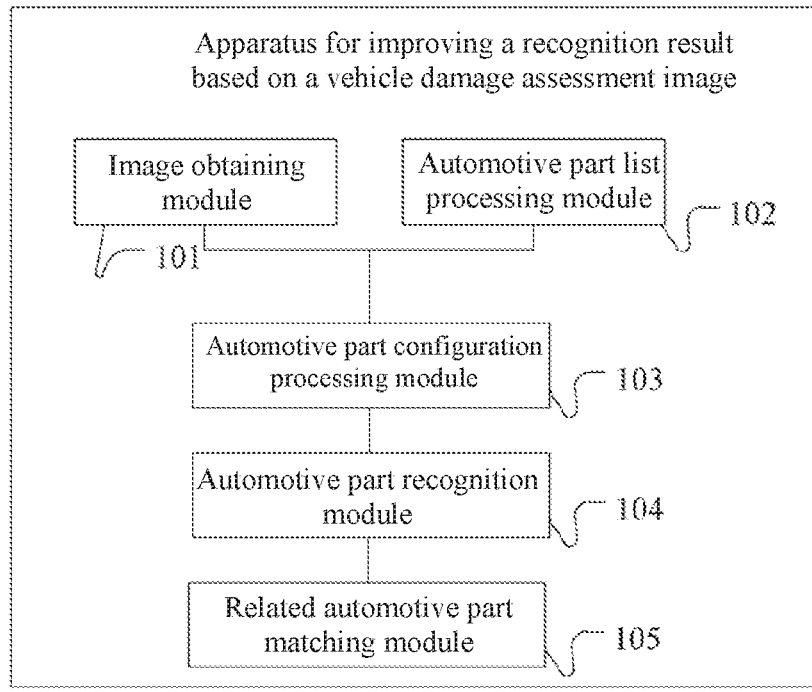
FIG. 6 is a schematic module structural diagram of still another apparatus for improving a recognition result based on a vehicle damage assessment image according to some embodiments of this specification.

FIG. 6 is a schematic module structural diagram of still another apparatus for improving a recognition result based on a vehicle damage assessment image according to some embodiments of this specification. As shown in FIG. 6, in some embodiments of the apparatus, the apparatus may further include: a related automotive part matching module 105, configured to: if there is no automotive part matching the damaged automotive part recognized by using the image recognition algorithm in the customized configuration of the automotive parts, search the customized configuration of the automotive parts for an automotive part having an automotive part inclusion relationship with the recognized damaged automotive part, and using the found automotive part having the inclusion relationship as the recognized damaged automotive part.

The methods for improving a recognition result based on a vehicle damage assessment image provided in the embodiments of this specification may be implemented by a processor executing corresponding program instructions in a computer, for example, by using C++ language of a Windows operating system on a PC, or by using hardware for an application design language set corresponding to other systems such as Linux, android, and iOS. In an embodiment of an apparatus for improving a recognition result based on a vehicle damage assessment image provided in this specification, the apparatus may include a processor and a memory configured to store instructions executable by the processor, and the processor executes the instructions to implement: obtaining a damage assessment image of a target vehicle; obtaining an automotive part list of the target vehicle, where the automotive part list includes configuration information of automotive parts of the target vehicle obtained based on a vehicle identification code of the target vehicle; determining customized configuration of the automotive parts of the target vehicle according to the automotive part list; and recognizing the damage assessment image for a damaged automotive part based on the customized configuration of the automotive parts by using a preset image recognition algorithm, to obtain an automotive part identification serial number of the recognized damaged automotive part.

The apparatus described above in the embodiments of this specification may further include other implementations according to descriptions of the related method embodiments. For an implementation, refer to the descriptions of the method embodiments, and details are not described herein again.

The embodiments of the present disclosure are all described in a progressive manner. The same or similar parts in the embodiments may be referenced among the embodiments. Each embodiment focuses on difference from other embodiments. Especially, a hardware and program type embodiment is basically similar to a method embodiment, and therefore is described briefly; for related parts, refer to the descriptions in the method embodiment.

Embodiments of this specification are described above. Other embodiments are within the scope of the appended claims. The actions or steps set forth in the claims may be performed in orders different from those in the embodiments and the desired results may still be achieved. In addition, the processes depicted in the accompany drawings may not require a special order or a sequential order for implementing the desired results. In some embodiments, multitasking and parallel processing are also possible or may be advantageous.

According to the apparatus for improving a recognition result based on a vehicle damage assessment image, before a damage assessment image of a target vehicle is recognized, customized configuration of the automotive parts of the target vehicle may be obtained by using automotive part list information of the target vehicle, to determine feature data of an automotive part on the target vehicle. Then, a damaged automotive part is recognized by using an image recognition algorithm. After the damaged automotive part is recognized, an automotive part identification serial number of the damaged automotive part is output according to the automotive part list, and the automotive part identification serial number can uniquely and accurately determine the automotive part, thereby greatly improving accuracy of an output damage assessment image recognition result. In addition, according to the obtained customized configuration data of the automotive parts of the target vehicle, an automotive part type that does not conform to an automotive part configuration of the target vehicle can be removed before the damaged automotive part is recognized from the damage assessment image, thereby improving the damage assessment image recognition processing speed. According to the embodiments in this specification, the customized configuration of the target vehicle can be determined based on the automotive part list refined into an individual vehicle, and then the damaged automotive part is recognized, so that recognition errors caused by vehicle model difference can be effectively reduced, accuracy of the damage assessment image recognition result can be improved, and overall recognition costs and the learning period of the damage assessment image recognition algorithm can further be reduced, thereby greatly improving efficiency of the overall vehicle damage assessment image recognition.

The apparatus or the methods described above can be applied to various servers for vehicle damage assessment image processing, to improve a recognition result based on a vehicle damage assessment image, improve accuracy of the image recognition result, reduce learning costs and the learning period of the algorithm on a server, and output accurate information of the damaged automotive part to a user, thereby improving user experience.

Figure 7:
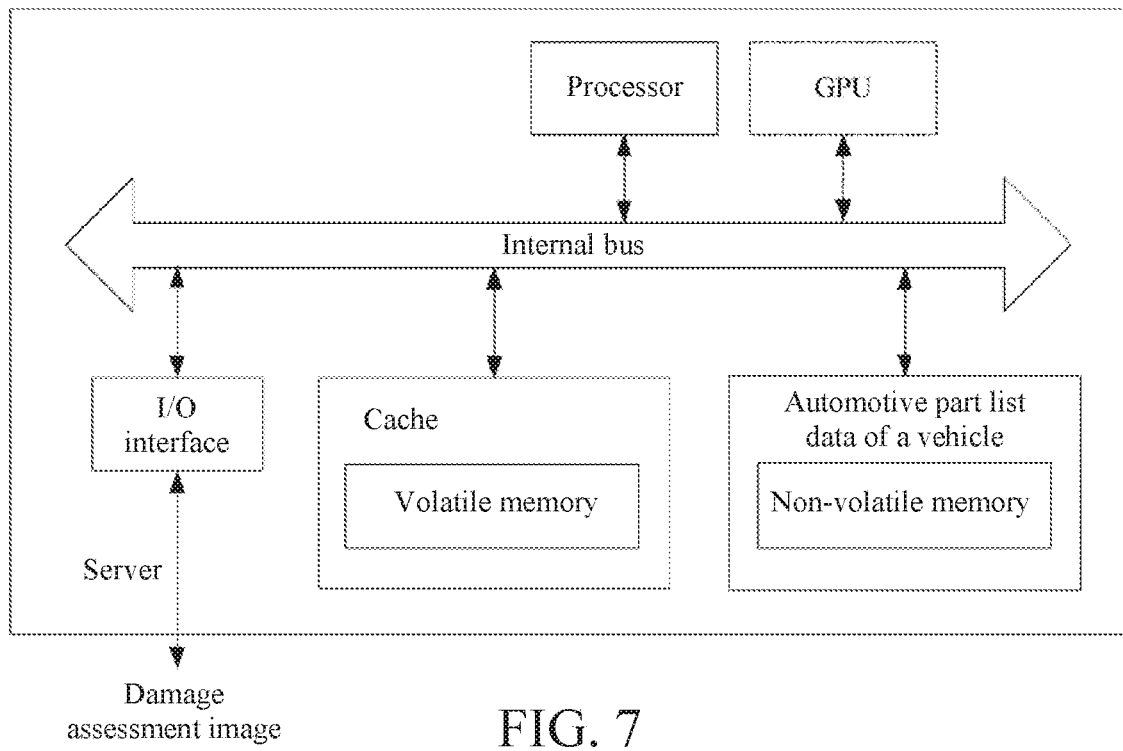
FIG. 7 is a schematic structural diagram of a server for improving a recognition result based on a vehicle damage assessment image according to some embodiments of this specification.

FIG. 7 is a schematic structural diagram of a server for improving a recognition result based on a vehicle damage assessment image according to some embodiments of this specification. The server may include at least one processor and a memory for storing instructions executable by the processor, the memory may be a computer storage medium of a volatile memory or a non-volatile memory, and the processor executes the instructions to implement: obtaining a damage assessment image of a target vehicle; obtaining an automotive part list of the target vehicle, where the automotive part list includes configuration information of automotive parts of the target vehicle obtained based on a vehicle identification code of the target vehicle; determining customized configuration of the automotive parts of the target vehicle according to the automotive part list; and recognizing the damage assessment image for a damaged automotive part based on the customized configuration of the automotive parts by using a preset image recognition algorithm, to obtain an automotive part identification serial number of the recognized damaged automotive part.

The computer-readable storage medium may include a physical apparatus configured to store information. The information is stored by using a medium in an electrical, magnetic, optical, or other forms after the information is digitized. The computer-readable storage medium described in the embodiments may include: an apparatus that stores information by using electrical energy, for example, various types of memories such as a RAM and a ROM; an apparatus that stores information by using magnetic energy, for example, a hard disk, a floppy disk, a magnetic tape, a magnetic core memory, a bubble memory, or a USB flash drive; and an apparatus that optically stores information, for example, a CD or a DVD. There may be readable storage medium in other forms, for example, a quantum memory, or a graphene memory. A structure of the server may further include other processing hardware, such as a graphics processing unit (GPU) or a bus. In an example for recognizing a damage assessment image, the server, shown in FIG. 7, may install a multi-processing phase algorithm. For example, 150 appearance pieces (automotive parts) is obtained from an automotive part list, some appearance pieces each have an OE code behind, and some appearance pieces have no OE code. An automotive part without an OE code may not be included in the target vehicle. An algorithm 1 may be designed for screening configuration of the target vehicle. For example, after a configuration list is retrieved, an automotive part that does not included in the configuration list is removed from the algorithm 1 through searching, and information about whether an automotive part includes upper and lower parts, and the like are also searched for in the list. Then, an algorithm 2 may be designed for automotive part segmentation, to classify or group automotive parts in the automotive part list or to establish a multi-level classification relationship among automotive parts in the automotive part list. An algorithm 3 may further be included for damage recognition of an automotive part in an image, rapid recognition of an automotive part that does not exist, or precise recognition of an automotive part including upper and lower parts or a complex automotive part, so that a recognized result can be matched with automotive parts in an automotive part list, and an accurate OE code can be output.

There may be other embodiments of the server described above according to descriptions of the method or apparatus embodiments. The descriptions of the method embodiments may be referenced for embodiments of the server, and details are not described herein again.

According to the method and the apparatus for improving a recognition result based on a vehicle damage assessment image, and the server that are provided in one or more embodiments of this specification, before a damage assessment image of a target vehicle is recognized, customized configuration of automotive parts of the target vehicle may be obtained by using automotive part list information of the target vehicle, to determine feature data of an automotive part on the target vehicle. Then, a damaged automotive part is recognized by using an image recognition algorithm. After the damaged automotive part is recognized, an automotive part identification serial number of the damaged automotive part is output according to the automotive part list. The automotive part identification serial number can uniquely and accurately determine the automotive part, thereby greatly improving accuracy of an output damage assessment image recognition result. In addition, according to the obtained customized configuration data of the automotive parts of the target vehicle, an automotive part type that does not conform to an automotive part configuration of the target vehicle can be removed before the damaged automotive part is recognized in the damage assessment image, thereby improving the damage assessment image recognition processing speed. According to the embodiments provided in this specification, the customized configuration of the target vehicle can be determined based on the automotive part list refined into an individual vehicle, and then the damaged automotive part is recognized, so that recognition errors caused by vehicle model difference can be effectively reduced, accuracy of the damage assessment image recognition result can be improved, and overall recognition costs and the learning period of the damage assessment image recognition algorithm can be reduced, thereby greatly improving efficiency of the overall vehicle damage assessment image recognition.

Although descriptions of image recognition, obtaining, interaction, calculation, determining, and the like, are mentioned in the embodiments of this specification, for example, recognizing the damaged automotive part by using the algorithm of the CNN network, hierarchical division of an automotive part list, obtaining the automotive part data while transmitting the damage assessment image to the server and converting the automotive part data into OE codes, determining the inclusion relationship between automotive parts, etc., the embodiments of this specification are not limited to being in accordance with industry communication standards, standard image data processing protocols, network models, computer processing and database rules, or those described in the embodiments of this specification. Some industry standards or implementations that have been slightly modified in a customized manner or based on the implementations described in the embodiments can also achieve the same, equivalent, or similar effects as those of the foregoing embodiments, or predictable effects after the changes. Embodiments obtained after applying these modifications or changes to the data obtaining, storage, determining, and processing manners can still fall into the scope of embodiments of this specification.

In the 1990s, improvements of technologies can be clearly distinguished between hardware improvements (for example, improvements to a circuit structure such as a diode, a transistor, a switch, etc.) and software improvements (improvements to a method procedure). However, with the development of technologies, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware physical module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic turnstile, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic turnstile, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module, or the unit described in the foregoing embodiments can be implemented by a computer chip or body, or implemented by a product having some function. A typical implementation device is a computer. Specifically, the computer may be, for example, a personal computer, a laptop computer, an in-vehicle man-machine interaction device, a cellular phone, a camera phone, a smartphone, a personal digital assistant, a media player, a navigation device, an email device, a game console, a tablet computer, a wearable device, or a combination thereof.

Although the embodiments of this specification provide method operation steps described in the embodiments or flowcharts, more or fewer operational steps may be included based on conventional means or non-creative means. The order of the steps listed in the embodiments is merely one of multiple step execution orders, and does not indicate the only execution order. When an actual apparatus or terminal product is executed, sequential execution or parallel execution may be performed according to the method orders shown in the embodiments or the accompany drawings (for example, in a parallel processor or multi-thread processing environment, and even a distributed data processing environment). The term "include," "comprise," or their any other variants is intended to cover a non-exclusive inclusion, so that a process, a method, a product, or a device that includes a series of elements not only includes such elements, but also includes other elements not expressly listed, or further includes elements inherent to such a process, method, product, or device. Unless otherwise specified, other same or equivalent elements existing in the process, the method, the product, or the device that includes the elements are not excluded.

For ease of description, when the foregoing apparatus is described, the apparatus is divided into modules according to functions described respectively. In the implementation of the embodiments of this specification, the functions of the modules may be implemented in a same piece of or multiple pieces of software and/or hardware, or modules implementing a same function may be implemented by using a combination of multiple submodules or subunits. The foregoing described apparatus embodiments are merely examples. For example, the unit division is merely logical function division and may be other divisions in other implementation. For example, multiple units or components may be combined or integrated into other systems, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person skilled in the art will also appreciate that, in addition to implementing the controller in the form of pure computer-readable program code, it is also possible to implement the controller in the form of a logic turnstile, switch, application-specific integrated circuit, programmable logic controller, and embedded microcontroller and other forms to achieve the same function. Such a controller can thus be considered as a hardware component and apparatus included therein for implementing various functions can also be considered as structures inside the hardware component. Alternatively, apparatus configured to implement various functions can be considered as both software modules implementing the method and structures inside the hardware component.

The specification is described with reference to the flowcharts and/or block diagrams of the method, the device (system), and the computer program product according to the embodiments. Computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing some function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements some function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing some function in one or more processes in the flowcharts and/or in one or more blocks in the block diagrams.

In a typical configuration, the computer device includes one or more processors (CPUs), an input/output interface, a network interface, and a memory.

The memory may include, among computer readable media, a volatile memory such as a random access memory (RAM) and/or a non-volatile memory such as a read-only memory (ROM) or a flash memory (flash RAM). The memory is an example of the computer-readable medium.

The computer-readable medium includes non-volatile, volatile, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the description in the present disclosure, the computer-readable medium does not include transitory computer readable media (transitory media), such as a modulated data signal and a carrier.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

The embodiments of this specification can be described in the general context of executable computer instructions executed by a computer, for example, a program module. Generally, the program module includes a routine, a program, an object, a component, a data structure, and the like for executing a particular task or implementing a particular abstract data type. The embodiments of this specification may also be practiced in distributed computing environments in which tasks are performed by remote processing devices that are connected by using a communications network. In a distributed computing environment, the program module may be located in both local and remote computer storage media including storage devices.

The embodiments in this specification are all described in a progressive manner. For same or similar parts in the embodiments, refer to these embodiments, and each embodiment focuses on difference from other embodiments. A system embodiment is basically similar to a method embodiment, and therefore is described briefly; for related parts, refer to the descriptions in the method embodiment. In the descriptions of this specification, descriptions of a reference term such as "an embodiment," "some embodiments," "an example," "a specific example," or "some examples" means that a feature, structure, material, or characteristic that is described with reference to the embodiment or the example is included in at least one embodiment or example of the embodiments of this specification. In this specification, schematic descriptions of the foregoing terms do not necessarily directed at a same embodiment or example. Besides, the specific feature, the structure, the material, or the characteristic that is described may be combined in a proper manner in any one or more embodiments or examples. In addition, in the embodiments that are not mutually contradictory, a person skilled in the art can combine or group different embodiments or examples that are described in this specification and features of the different embodiments or examples.

The foregoing descriptions are merely embodiments of the embodiments of this specification, and are not intended to limit the embodiments of this specification. For a person skilled in the art, various modifications and changes may be made to the embodiments of this specification. Any modifications, equivalent replacements, and improvements made within the spirit and principle of the embodiments of this specification shall fall within the scope of the claims of the embodiments of this specification.

What is claimed is:

1. A computer-implemented method for automotive part recognition based on a vehicle damage assessment image, comprising:
    obtaining a damage assessment image of a target vehicle;
    obtaining an automotive part list of the target vehicle based on a vehicle identification code of the target vehicle, wherein the automotive part list comprises customized configuration information of automotive parts of the target vehicle; and
    determining a damaged automotive part of the target vehicle from the damage assessment image based on the customized configuration information of the automotive parts of the target vehicle and an image recognition algorithm, to obtain an automotive part identification serial number of the determined damaged automotive part.

2. The method according to claim 1, wherein the obtaining an automotive part list of the target vehicle based on a vehicle identification code of the target vehicle comprises:
    in a process of obtaining the damage assessment image of the target vehicle, querying automotive part data of the target vehicle according to the vehicle identification code, and converting the automotive part data into a plurality of corresponding automotive part identification serial numbers.

3. The method according to claim 1, wherein the determining a damaged automotive part of the target vehicle from the damage assessment image based on the customized configuration information of the automotive parts of the target vehicle and an image recognition algorithm comprises:
    reading the customized configuration information of the automotive parts of the target vehicle in the automotive part list;
    recognizing the damaged automotive part in the damage assessment image by using the image recognition algorithm; and
    determining the automotive part identification serial number of the recognized damaged automotive part according to the customized configuration information of the automotive parts of the target vehicle in the automotive part list.

4. The method according to claim 1, wherein the customized configuration information of the automotive parts comprises at least one information selected from the following:
    information indicating a feature attribute of automotive parts in a same vehicle model and a same level configuration;
    information indicating at least two level classifications of automotive parts; and
    data indicating a customized feature of an automotive part on the target vehicle.

5. The method according to claim 1, wherein the determining a damaged automotive part of the target vehicle from the damage assessment image based on the customized configuration information of the automotive parts of the target vehicle and an image recognition algorithm comprises:

determining an automotive part classification to which the damaged automotive part recognized by using the image recognition algorithm belongs based on the customized configuration information of the automotive parts; and using the image recognition algorithm to recognize the damaged automotive part based on the automotive part classification.

6. The method according to claim 1, wherein the determining a damaged automotive part of the target vehicle from the damage assessment image based on the customized configuration information of the automotive parts of the target vehicle and an image recognition algorithm comprises:

in response to the customized configuration information of the automotive parts indicating that there is no automotive part matching the damaged automotive part recognized by using the image recognition algorithm, searching the customized configuration information of the automotive parts for an automotive part having an automotive part inclusion relationship with the recognized damaged automotive part, and determining the automotive part having the inclusion relationship as the recognized damaged automotive part.

7. The method according to claim 6, wherein the automotive part having the automotive part inclusion relationship with the recognized damaged automotive part includes the recognized damaged automotive part or is included in the recognized damaged automotive part.

8. An apparatus for automotive part recognition based on a vehicle damage assessment image, comprising one or more processors and one or more non-transitory computer-readable memories coupled to the one or more processors and configured with instructions executable by the one or more processors to cause the apparatus to perform operations comprising:

obtaining a damage assessment image of a target vehicle;

obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain an automotive part identification serial number of the determined damaged automotive part.

9. The apparatus according to claim 8, wherein the obtaining an automotive part list of the target vehicle based on a vehicle identification code of the target vehicle comprises:

in a process of obtaining the damage assessment image of the target vehicle, querying automotive part data of the target vehicle according to the vehicle identification code, and converting the automotive part data into a plurality of corresponding automotive part identification serial numbers.

10. The apparatus according to claim 8, wherein the determining a damaged automotive part of the target vehicle from the damage assessment image based on the customized configuration information of the automotive parts of the target vehicle and an image recognition algorithm comprises:

reading the customized configuration information of the automotive parts of the target vehicle in the automotive part list;

recognizing the damaged automotive part in the damage assessment image by using the image recognition algorithm; and determining the automotive part identification serial number of the recognized damaged automotive part according to the customized configuration information of the automotive parts of the target vehicle in the automotive part list.

11. The apparatus according to claim 8, wherein the customized configuration information of the automotive parts comprises at least one information selected from the following:

information indicating a feature attribute of automotive parts in a same vehicle model and a same level configuration;

information indicating at least two level classifications of automotive parts; and data indicating a customized feature of an automotive part on the target vehicle.

12. The apparatus according to claim 8, wherein the determining a damaged automotive part of the target vehicle from the damage assessment image based on the customized configuration information of the automotive parts of the target vehicle and an image recognition algorithm comprises:

determining an automotive part classification to which the damaged automotive part recognized by using the image recognition algorithm belongs based on the customized configuration information of the automotive parts; and using the image recognition algorithm to recognize the damaged automotive part based on the automotive part classification.

13. The apparatus according to claim 8, wherein the determining a damaged automotive part of the target vehicle from the damage assessment image based on the customized configuration information of the automotive parts of the target vehicle and an image recognition algorithm comprises:

in response to the customized configuration information of the automotive parts indicating that there is no automotive part matching the damaged automotive part recognized by using the image recognition algorithm, searching the customized configuration information of the automotive parts for an automotive part having an automotive part inclusion relationship with the recognized damaged automotive part, and determining the automotive part having the inclusion relationship as the recognized damaged automotive part.

14. The apparatus according to claim 13, wherein the automotive part having the automotive part inclusion relationship with the recognized damaged automotive part includes the recognized damaged automotive part or is included in the recognized damaged automotive part.

15. A non-transitory computer-readable storage medium configured with instructions executable by one or more processors to cause the one or more processors to perform operations comprising:

obtaining a damage assessment image of a target vehicle;

obtaining an automotive part list of the target vehicle based on a vehicle identification code of the target vehicle, wherein the automotive part list comprises customized configuration information of automotive parts of the target vehicle; and determining a damaged automotive part of the target vehicle from the damage assessment image based on the customized configuration information of the automotive parts of the target vehicle and an image recognition algorithm, to obtain an automotive part identification serial number of the determined damaged automotive part.

16. The non-transitory computer-readable storage medium according to claim 15, wherein the obtaining an automotive part list of the target vehicle based on a vehicle identification code of the target vehicle comprises:
in a process of obtaining the damage assessment image of the target vehicle, querying automotive part data of the target vehicle according to the vehicle identification code, and converting the automotive part data into a plurality of corresponding automotive part identification serial numbers.

17. The non-transitory computer-readable storage medium according to claim 15, wherein the determining a damaged automotive part of the target vehicle from the damage assessment image based on the customized configuration information of the automotive parts of the target vehicle and an image recognition algorithm comprises:
reading the customized configuration information of the automotive parts of the target vehicle in the automotive part list;
recognizing the damaged automotive part in the damage assessment image by using the image recognition algorithm; and
determining the automotive part identification serial number of the recognized damaged automotive part according to the customized configuration information of the automotive parts of the target vehicle in the automotive part list.

18. The non-transitory computer-readable storage medium according to claim 15, wherein the customized configuration information of the automotive parts comprises at least one information selected from the following:

information indicating a feature attribute of automotive parts in a same vehicle model and a same level configuration;
information indicating at least two level classifications of automotive parts; and
data indicating a customized feature of an automotive part on the target vehicle.

19. The non-transitory computer-readable storage medium according to claim 15, wherein the determining a damaged automotive part of the target vehicle from the damage assessment image based on the customized configuration information of the automotive parts of the target vehicle and an image recognition algorithm comprises:
determining an automotive part classification to which the damaged automotive part recognized by using the image recognition algorithm belongs based on the customized configuration information of the automotive parts; and
using the image recognition algorithm to recognize the damaged automotive part based on the automotive part classification.

20. The non-transitory computer-readable storage medium according to claim 15, wherein the determining a damaged automotive part of the target vehicle from the damage assessment image based on the customized configuration information of the automotive parts of the target vehicle and an image recognition algorithm comprises:
in response to the customized configuration information of the automotive parts indicating that there is no automotive part matching the damaged automotive part recognized by using the image recognition algorithm, searching the customized configuration information of the automotive parts for an automotive part having an automotive part inclusion relationship with the recognized damaged automotive part, and determining the automotive part having the inclusion relationship as the recognized damaged automotive part.

* * * * *